United States Patent [19]

Katsuki et al.

[11] Patent Number: 5,227,981
[45] Date of Patent: Jul. 13, 1993

[54] INITIAL PROCESS SYSTEM AFTER CUTOFF OF POWER SOURCE AND PROCESS SYSTEM AT THE TIME OF CUTOFF OF POWER SOURCE

[75] Inventors: Hikaru Katsuki, Kiryu; Masakazu Hosoya; Masayuki Shimizu, both of Oizumimachi, all of

[73] Assignee: Sanyo Electric Co., Ltd., Osaka, Japan

[21] Appl. No.: 885,054

[22] Filed: May 13, 1992

Related U.S. Application Data

[63] Continuation of Ser. No. 510,776, Apr. 18, 1990, abandoned.

[30] Foreign Application Priority Data

Apr. 20, 1989 [JP] Japan .................. 1-100755
Apr. 20, 1989 [JP] Japan .................. 1-100756
Sep. 8, 1989 [JP] Japan .................. 1-233295

[51] Int. Cl.[5] ............................................. G06F 15/56
[52] U.S. Cl. ......................................... 364/483; 62/158; 364/480; 364/505
[58] Field of Search ............... 364/480, 481, 483, 492, 364/184, 505, 707, 431.12; 371/12, 13, 14; 62/126, 158, 160; 236/46 R, 51, 94

[56] References Cited

U.S. PATENT DOCUMENTS

| | | | |
|---|---|---|---|
| 4,217,646 | 8/1980 | Caltagirone et al. ............... | 364/505 |
| 4,333,316 | 6/1982 | Stamp, Jr. et al. ................. | 236/51 |
| 4,412,284 | 10/1983 | Kerforne et al. .................... | 364/200 |
| 4,535,409 | 8/1985 | Jindrick et al. .................... | 364/492 |
| 4,611,289 | 9/1986 | Coppola ............................... | 364/492 |
| 4,630,221 | 12/1986 | Heckenbach et al. ............... | 364/505 |
| 4,784,212 | 11/1988 | Brimer et al. ........................ | 364/557 |
| 4,803,682 | 2/1989 | Hara et al. .......................... | 364/200 |
| 4,841,738 | 6/1989 | Katsuki et al. ...................... | 62/160 |
| 4,845,594 | 7/1989 | Wickerson ........................... | 364/480 |
| 4,931,975 | 6/1990 | Gleason, III et al. ............... | 364/570 |
| 4,972,340 | 11/1990 | Nakatsuru et al. ................. | 364/431.12 |
| 4,980,836 | 12/1990 | Carter et al. ........................ | 364/483 |
| 4,987,363 | 1/1991 | Gibbs et al. ......................... | 364/483 |
| 4,994,934 | 2/1991 | Bouhenguel ......................... | 364/483 |

FOREIGN PATENT DOCUMENTS 59-46001 9/1984 Japan .

*Primary Examiner*—Kevin J. Teska
*Attorney, Agent, or Firm*—Nikaido, Marmelstein, Murray & Oram

[57] ABSTRACT

In a system using a processor or microprocessor for executing a predetermined initial processing and than a main processing based on a predetermined program when a reset signal is inputted, a start processing system after cutoff of a power source of the present invention includes a read-only memory (ROM) for storing a program for executing the initial processing, a program for executing the main processing and for storing initial data, a random access memory (RAM) for storing and reading data when the main processing is executed and a backup device for keeping driving of the RAM for a predetermined time after cutoff of the power source. The program for executing the initial start program includes a program for comparing data stored at a predetermined address area of the RAM memory with data stored at a predetermined address area of the ROM and for moving the initial data stored in the ROM to the RAM when the result of comparison of the data proves different.

2 Claims, 5 Drawing Sheets

| Compressor | Blower | Temp. Set Value C | Temp. Set Value H | | Cool/Heat |
|---|---|---|---|---|---|
| OFF | OFF | 28 | 22 | --- | Auto |

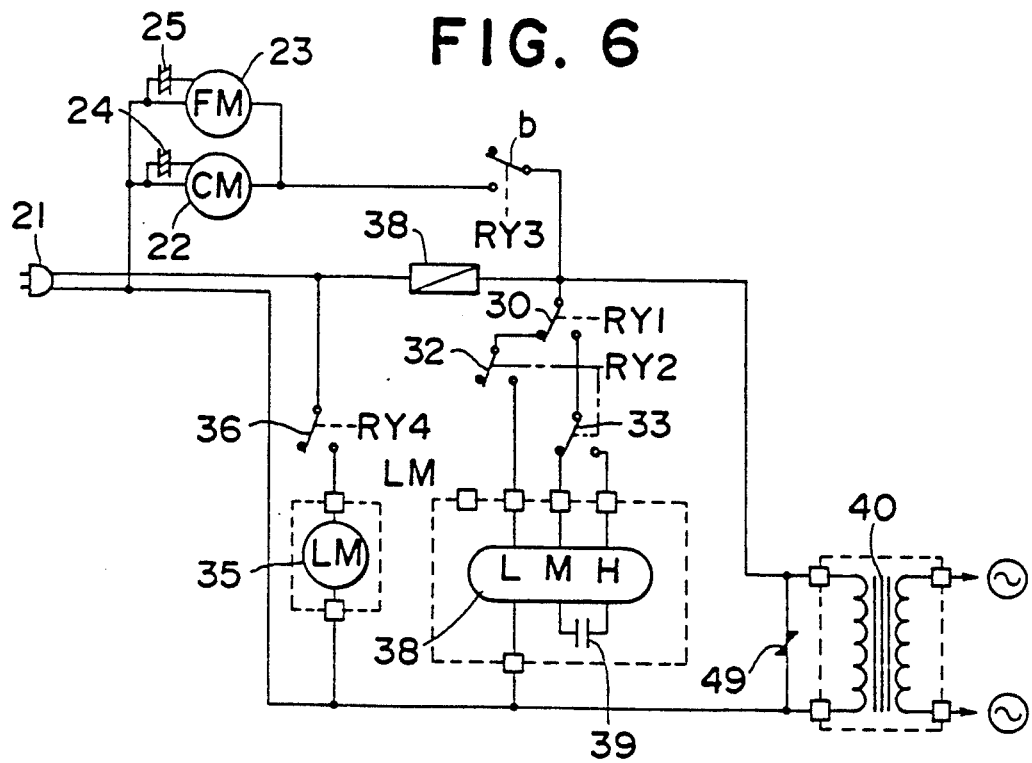
FIG. 6
FIG. 8
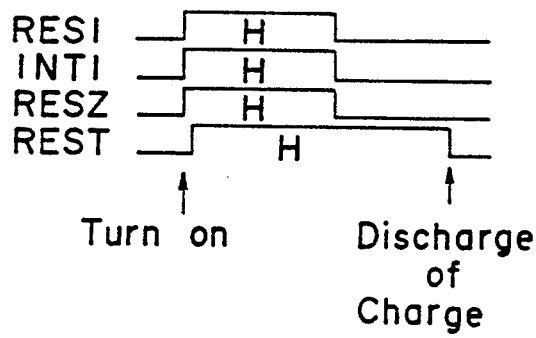
Turn on      Discharge of Charge
FIG. 9
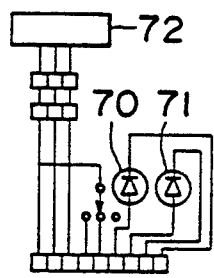
FIG. 10
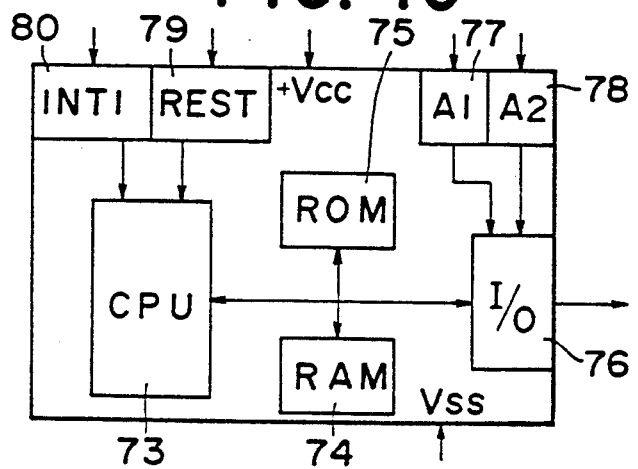

INITIAL PROCESS SYSTEM AFTER CUTOFF OF POWER SOURCE AND PROCESS SYSTEM AT THE TIME OF CUTOFF OF POWER SOURCE

This application is a continuation of application Ser. No. 510,776 filed Apr. 18, 1990 now abandoned.

BACKGROUND OF THE INVENTION

The present invention relates in general to an apparatus whose operation is controlled by a system such as a microcomputer including a processor or a microprocessor and a read-only memory (ROM), and more particularly this invention relates to an initial processing system, in the apparatus described above, at the time of automatic restoration of the processor or microprocessor after cutoff of a power source due to service failure, or the like, and to a processing system for data protection in the system described above at the time of cutoff of the power source.

A conventional service failure processing system is disclosed, for example, in Japanese Patent Publication No. 59-46001/1984. In accordance with this prior art reference, a processor determines whether a control operation is stopped or started again automatically in accordance with the drop of a power source voltage and the time period of the drop. If the service failure is an instantaneous service failure which does not render any particular problem, the control operation by the processor is automatically started once again. Automatic restoration of the processor is made in accordance with the condition of the instantaneous service failure in the construction described above.

If the power source voltage drops to a level which is somewhat insufficient for the operation of each circuit such as the microprocessor and yet permits its operation in the prior art publication described above, an abnormality interrupt signal is generated from a voltage monitor and is given to the control processor so that the operating condition of the control processor changes from "control" to "stop".

In the instantaneous service failure processing system described above, the service failure processing is carried out by selecting the processor operation either to halt or to completely stop in accordance with the drop of the power source voltage but a second processor (or register) is necessary for executing such a processing. Further, a power source of this register is necessary. Therefore, the control circuit gets complicated as a whole and becomes large in scale due to the space for the power source.

In the halt state of the processor operation, the power source is still supplied to the processor, the processor is still operable, input/output ports keep their outputs and each circuit is under the operating state. Accordingly, power consumption is not very large as a whole.

Though the prior art technique described above can bring the microprocessor to a halt by detecting the voltage, the microprocessor enters the stop state at the time of actual service failure or at the time of cutoff of the power source because no backup mechanism is provided. Therefore, the content of a random access memory (RAM) cannot be protected. Even if a backup mechanism is provided, it must have a capacity large enough to keep the operations of the input/output circuits and each circuit because they are still under the operating state and hence the mechanism becomes large in scale.

To solve such problems, the present invention provides a initial start processing system which can make an automatic return without requiring a register and a power source for the register.

SUMMARY OF THE INVENTION

It is an object of the present invention to provide a processing system at the time of cutoff of the power source which can protect data in the system by use of a backup mechanism having a small capacity at the time of a service failure, or the like.

A system uses a processor or microprocessor which a) executes a predetermined initial processing and then b) executes a main processing based on a predetermined program when a reset signal, output at the time of restoration of a power source, is input. The processing system in accordance with the present invention includes a read-only memory (ROM) for storing a) a program for executing the start processing, b) a program for executing the main processing and c) initial data. The processing system also includes a random access memory (RAM) for storing and reading data when the main processing is executed, and a backup mechanism for continually driving 1) the RAM for a predetermined period of time after cutoff of the power source, and 2) the program for comparing data stored at a predetermined position of the RAM with data stored at a predetermined position of the ROM and for transferring the initial data stored in the ROM to the RAM when the result of comparison proves different.

The initial processing system of the present invention includes a program for executing the main processing using the data stored in the RAM when the result of the comparison described above proves coincident.

A microprocessor includes a processor unit and a RAM which inputs and outputs data with the processor unit. The microprocessor is equipped with a stop mode for stopping part of the functions while keeping priority of driving of the random access memory so as to limit power consumption. A processing system, at the time of cutoff of the power source in accordance with the present invention, includes a backup mechanism for keeping the supply of the power source to the microprocessor for at least a predetermined period and a detection circuit for detecting the voltage of the power source supplied to the microprocessor. The processing system brings the microprocessor into the operation mode when the detection circuit detects a drop in voltage to an operation guarantee voltage of the microprocessor.

A microcomputer includes 1) a processor unit which starts the operation based on a program when an edge trigger signal is applied to its reset terminal and 2) a RAM for storing and reading data with this processor unit. The microprocessor is equipped with a stop mode for stopping the operation of part of the functions while maintaining priority for driving of the RAM so as to reduce power consumption. The processing system at the time of cutoff of the power source, in accordance with another embodiment of the present invention, includes a) a backup circuit for keeping the supply of power to the microcomputer for at least a predetermined period of time from the cutoff of the power source and b) a voltage detection circuit for detecting the voltage of the power source supplied to the microcomputer in a peripheral circuit of the microcomputer. The processing system brings the microcomputer into the stop mode when the voltage value detected by the voltage detection circuit drops to an operation guarantee voltage of the microcomputer, and supplies the power from the backup circuit to the reset terminal during this stop mode.

In accordance with the start processing system having the construction described above, the data of the RAM memory is used as such if the preservation state of the RAM is normal even if the reset signal for the restoration of the power source is applied automatically to the processor or microprocessor. When any abnormality exists in the data of the RAM memory (the backup period expires), the content of the RAM memory is rewritten using the data of the ROM and then the operation based on the main program is started. Accordingly, the data of the RAM is preserved as such at the time of service failure or cutoff of the power source for a short period and the operation by such data is automatically resumed.

When the processing system at the time of cutoff of the power source having the construction described above is employed, the voltage detection circuit detects the drop of the power source voltage supplied to the microprocessor and the stop mode is actuated to preserve the data of the RAM while limiting power consumption of the microcomputer.

In the processing system at the time of cutoff of the power source of the latter, the data of the RAM is preserved and at the same time, the state of the microcomputer is stabilized at the time of the stop because the reset terminal is kept at the power source voltage.

In the present invention, a system has a plurality of electric appliances. A processor device executes an initial process for the system and executes a main process to control the electric appliances in accordance with a predetermined program and changeable set (preset) data. The initial and main processings are executed when a reset signal, generated by supplying electric power to system, is applied to the processor. The system comprises:

(1) a random access memory (RAM) for storing and reading the data while electric power is being supplied;

(2) a read only memory (ROM) for storing data and programs in a non-destructive way. The ROM stores:
  a. an initial program for executing the initial process,
  b. main program for executing the main process,
  c. first data which is read out by the processor while the processor is running the initial program, and
  d. initial data of the set (preset) data stored in the random access memory (RAM), which is read out by the processor while the processor is running the main program. The RAM stores the set data which is read out by the processor while the processor is running the main program, and stores second data which is moved by the processor while the processor is running the main program. The second data is equal to the first data. The set data is used for controlling the electric appliances by the processor while the processor is running the main program. The set data is to be changed by a system user while the main program is running;

(3) backup device continually supplies electric power to the RAM for at least a predetermined period after cutting off the electric power.

The initial program has the following four steps and is run by the processor when the reset signal is received by the processor:

1) a first step for initializing the processor, 2) a second step for reading out the first data and the second data and then determining coincidence of the first and second data, 3) a third step for running the main program when the first data is equal to the second data, and 4) a fourth step, following after the second step, for changing the set data in the RAM to the initial data in the ROM and then running the main program when the first data is not equal to the second data.

The main program is run by the processor after the initial program to thereby change the set data in the RAM and to control the operation of the electric appliances in accordance with the set data of the RAM.

When the reset signal is applied to the processor while less electric power is applied to the RAM, the set data stored in the RAM is changed to the initial data in the ROM and then the processor runs the main program and starts to control the operation of the system in accordance with the set data of the RAM. When the reset signal is applied to the processor while electric power is applied to the RAM, the processor runs the main program and starts to control the operation of the system in accordance with the set data in the RAM.

In a preferred embodiment, the processor has a stop mode for partially stopping operations of the processor to thereby decrease the consumption of electric power within the system. The stop mode is executed when electric voltage applied from an electric power source to the system is lowered to a predetermined value.

In another embodiment of the present invention, there is provided a microcomputer system including:
  a processor unit for executing only an initial operation based on a program when an edge trigger signal is applied to a reset terminal of the processor, and
  a RAM for storing data which is stored and read out by the processor.

The microcomputer system has a stop mode for partially stopping the operation of the processor unit to thereby reduce the consumption of electric power within the system. The stop mode is maintained preferentially relative to an operation of the RAM.

The microcomputer system also comprises:
  a backup circuit for keeping the supply of electric power to the processor and the RAM for at least a predetermined period of time upon cutoff of electric power source, and
  a voltage detection circuit for detecting the voltage of the electric power source supplied to the system.

When the voltage detection circuit detects that the voltage of the electric power source is less than a predetermined value, an operation mode of the processor unit is changed to the stop mode. While the stop mode is maintained, a high or a low digital signal is applied to reset terminals of the processor unit by the use of electric power from the backup circuit.

These and other objects and novel features of the present invention will become more apparent from the following detailed description when taken in conjunction with the accompanying drawings.

BRIEF DESCRIPTION OF THE DRAWINGS

FIGS. 7 and 9 are electronic circuit diagrams of the air conditioner using some embodiments of the present invention;

FIG. 8 is a time chart showing the change of the output of IC 44 shown in FIG. 7; and FIG. 10 block diagram of the principal portions and shows the internal construction of the microcomputer shown in FIG. 2.

DESCRIPTION OF THE PREFERRED EMBODIMENT

Hereinafter, a preferred embodiment wherein the start processing system of the invention is applied to an air conditioning system for heating or cooling based on a set temperature.

Figure 1:
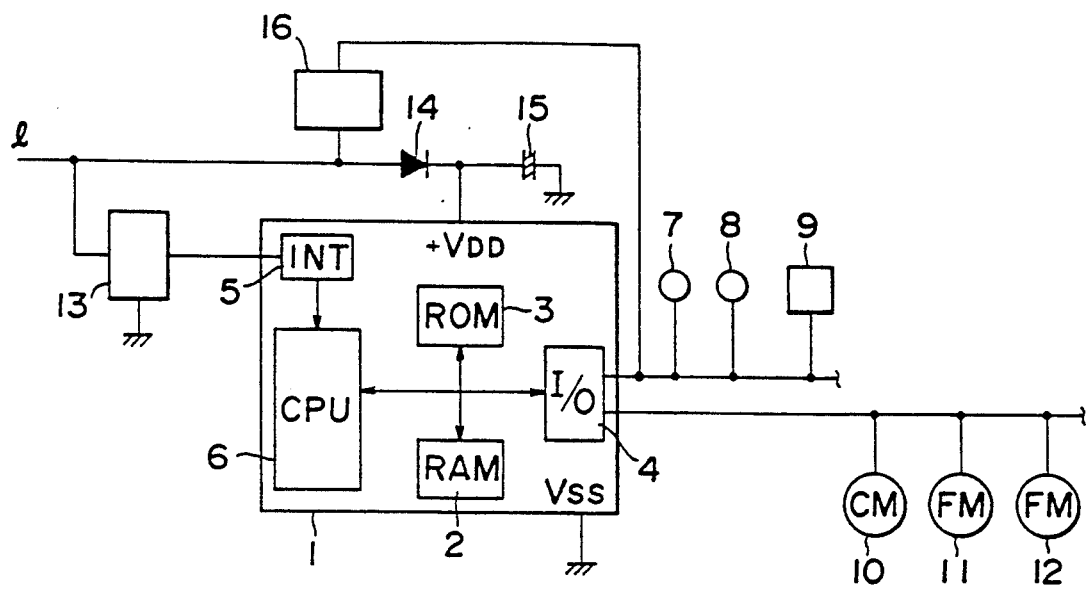
FIG. 1 is a block diagram showing schematically the structure of the principal portions of a control circuit of an air conditioner using embodiment of the present invention.

FIG. 1 is a block diagram showing schematically the principal portions of a control circuit of this air conditioner. In the drawing, reference numeral 1 represents a microprocessor for control, which includes a processor unit 6, a random access memory (hereinafter referred to as "RAM")2, a read-only memory (hereinafter referred to as "ROM") 3, an interface portion 4 and an interrupt control portion 5 that are molded unitarily. A terminal +VDD is a power input terminal and a terminal VSS is a ground terminal. This processor unit 6 executes a main processing operation based on a program and initial data stored in ROM 3 and data which are stored and read to and from RAM 2. A temperature sensor (such as a thermistor) 7 for detecting the temperature of a room to be conditioned (room temperature), a humidity sensor 8 for detecting the humidity of the room, a key group 9 for setting or inputting operation modes such as cooling/heating modes, normal operation/timer operation, a room temperature set value, a humidity set value, a wind velocity, blasting direction of hot air/cold air, and so forth, a compressor 10, an indoor blower 11, an outdoor blower 12, etc, are connected to the interface portion 4. When a signal is given thereto from outside, the interrupt control portion 5 gives a signal to the processor unit and lets it execute a program for initial processing. The room temperature and humidity are subjected to A/D conversion (not shown) and converted to data and are then stored in RAM 2. The key operation of the key group 9 is input by a key scan and its result is stored in RAM 2. The operations of the devices 10-12 are controlled in response to the output signal of the interface portion 4. Reference numeral 13 represents a reset signal output portion, which outputs a reset signal after the passage of a predetermined time (the time in which a charge is sufficiently charged in a capacitor 15) from the arrival of the potential of a power source bus 1 at a predetermined value (a power-ON reset circuit of a power source monitor IC).

A diode 14 prevents the charge stored in the capacitor 15 from flowing to the power source side or to the reset signal output portion 13 at the time of cut-off of the power source. This capacitor 15 is for the microprocessor 1 (mainly for back-up of RAM 2) and its capacitance is set with a time of about 10 minutes as a guideline. The backup mechanism may be constituted by use of a chargeable/dischargeable battery in place of the capacitor 15. A voltage drop detection circuit 16 gives a signal to the interface portion 4 when the voltage of the power source bus 1 is below a predetermined value (below about 95% of the rated voltage). Detecting this signal, the microprocessor 1 enters the stand-by state (where only preservation of the data of RAM 2 is made). In other words, preservation of the data of RAM 2 becomes possible in the discharge period of the capacitor 15.

In the air conditioner having the construction described above, the operation of the compressor 1 is controlled by comparing the set temperature of the room set mainly by the key group 9 with the room temperature detected by the temperature sensor 7 in the normal operation to control the temperature of the room.

Figure 2:
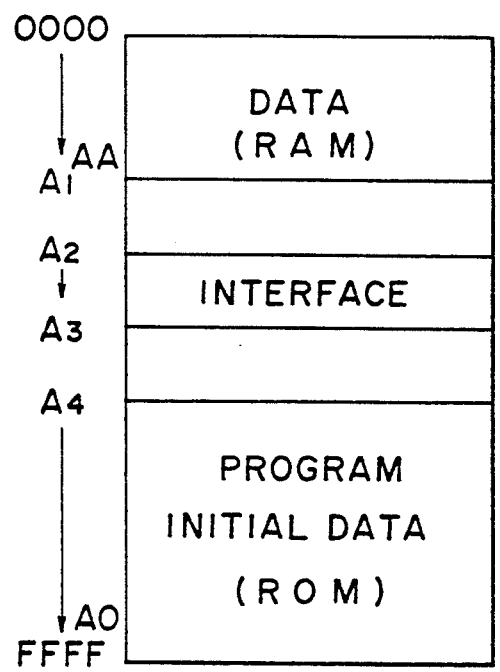
FIG. 2 is an explanatory view showing allotment state of addresses of RAM an interface portion shown in FIG. 1.

FIG. 2 shows the allotment state of addresses of RAM 2, ROM 3 and the interface portion 4. The addresses 0000-A1 are the memory area which is used by RAM 2 and they represent a data area. The addresses A2-A3 represent an interface area (the space which designates the output of the interface portion 4). The addresses A4-FFFF are the memory area space which is used by ROM 3 and represent a program (a program for executing the initial processing and a program for executing the main processing) and initial data.

Figure 3:
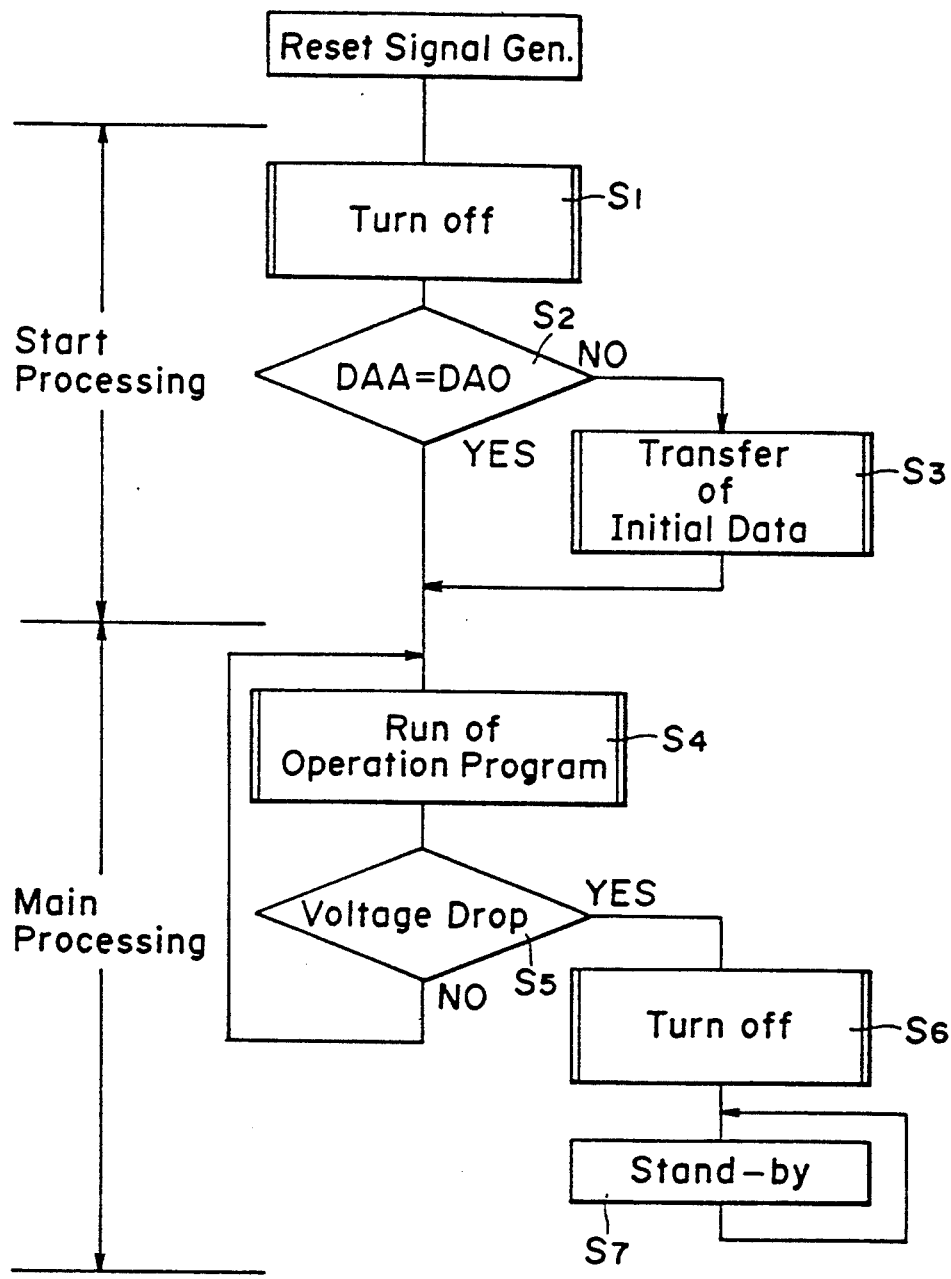
FIG. 3 is an operation explanatory view showing the main operations of the shown in FIG. 1.

FIG. 3 is an operation explanatory view showing the main operations of the microprocessor 1 when the reset signal is output from the reset by the interrupt control portion 5. At step S1, all the devices such as the compressor 10, the blowers 11, 12, etc, are all stopped. Next, the flow proceeds to step S2, which determines whether or not the DAA value is equal to the DAO value. The DAA value is the value of the data stored in the address AA shown in FIG. 2 (the value stored at the address AA of RAM) and similarly, the DAO value is the value of the data stored in the address AO (the value stored at the address AO of ROM). In other words, the determination at this step S2 is to determine whether or not the data in RAM 2 is destroyed by the cut-off of the power source from the power source bus 1. As long as the stored charge exists in the capacitor, continuous power supply is secured and destruction of the data due to cut-off of the power source bus 1 does not occur. If the condition of step S2 is not satisfied, the flow proceeds to step S3. Transfer of the initial data is made at this step S3. In other words, the data stored in ROM 3 is transferred to RAM 2. At this time the data of the address DAO, too, is also moved to the address DAA. The steps S1-S3 described above are the program for executing the initial processing.

Figures 4, 5:
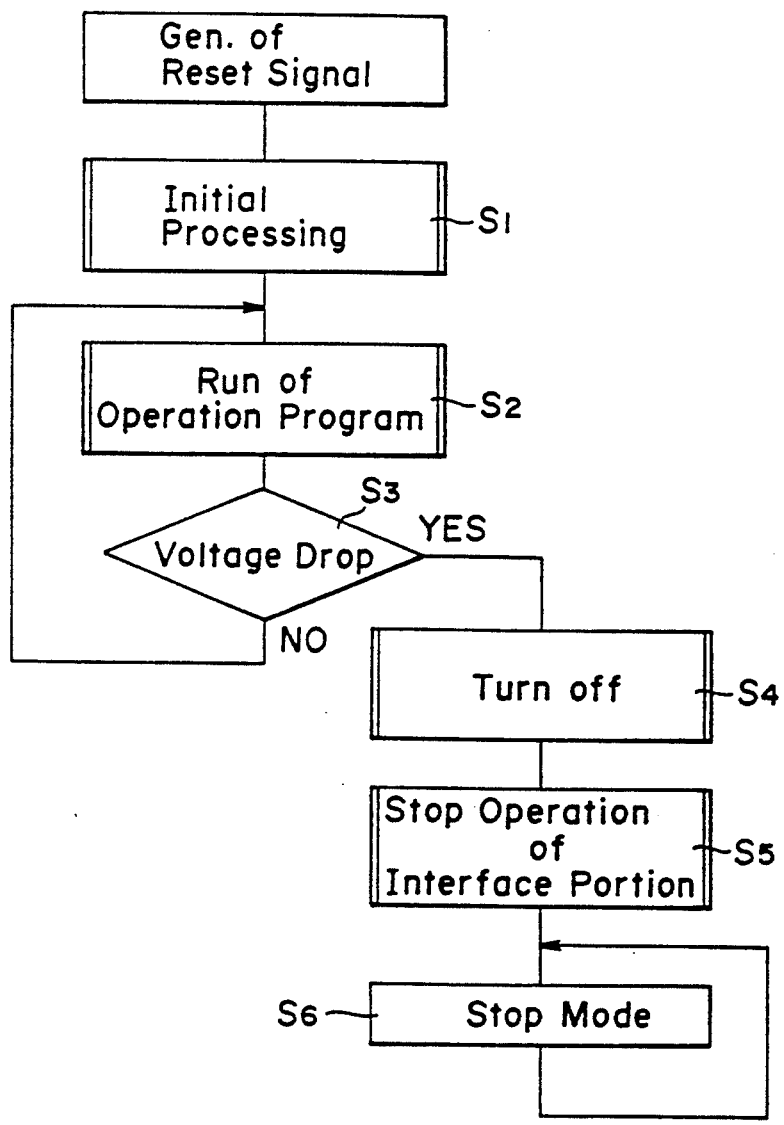
FIG. 4 is an explanatory view showing initial data used in the embodiment invention.
FIG. 5 is an operation explanatory view showing the main operations of the microprocessor shown in FIG. 1.

FIG. 4 is an explanatory view showing the initial data. Data such as OFF (stop) for the compressor, OFF (stop) for the blower, 28° C. for a set temperature C (for cooling operation), 22+ C. for a set temperature H (for heating operation), . . . , automatic selection for the cooling/heating modes (which are selected in accordance with the room temperature at the start of the operation), and the like, are set in advance. In other words, the initial data is that data which sets the air conditioner to the stop state. When step S3 is executed, the initial data is transferred to the corresponding position of RAM 2. When DAA=DAO is determined at step S2 or after step S3 is executed, the flow proceeds to step S4. The operation program of the air conditioner is executed at step S4. For example, the room temperature and the set temperature stored in RAM 2 are compared to control the operation of the compressor, the blast quantity of the blower is controlled by the difference between the room temperature and the set value and the time is counted during the timer operation. Next, the flow proceeds to step S5, and whether or not the voltage of the power source bus 1 drops below a predetermined value is determined. In other words, a determination is made whether or not the voltage drop detection circuit 16 outputs the signal. When the voltage of the power source bus 1 drops, the flow proceeds to step S6. The devices are turned OFF at step S6. In other words, the air conditioner is stopped. The flow then proceeds to step S7, where the processor unit 6 is brought into the stand-by state. These steps S4–S7 are the program for executing the main processing.

In the operation using an air conditioner having such a construction, when the power is first applied to the air conditioner, the power is supplied through the power source bus 1 and charging of the capacitor 15 is started through the diode 14. At the same time, the power is supplied to the +VDD terminal of the microprocessor 1 and the microcomputer becomes operative. When the charge is sufficiently stored in the capacitor 15, the reset signal output portion 13 outputs the reset signal. Inputting this reset signal, the microprocessor 1 first executes the program of initial processing. In other words, after the air conditioner is once stopped, the data of the address AA and the content of the address AO are compared but since the charge of the capacitor 15 has fully been discharged and the data of RAM 2 is not backed up, the determination at step S2 proves to be "NO". Accordingly, the initial data is moved to RAM 2 at step S3 and further, the data of the address AO is moved to the area of address AA of RAM 2, too. Thereafter, while the air conditioner is kept stopped, the program of the main processing is run. When the cooling or heating signal is output by the key group 9 during the running of this main program, the air conditioner starts cooling or heating based on the initial data. If the content of the initial data is not satisfactory to the user, the content of this data, that is, the set values (the temperature set value, the wind quantity, etc) are changed by the key group 9. The operation is thereafter carried out based on set values. If the voltage of the power source supplied from the power source bus 1 drops below the predetermined voltage due to service failure or cut-off of the power source after the operation is kept or in other words, when the voltage drop detection circuit 16 outputs the signal, the microprocessor 1 executes step S6. Namely, the air conditioner is stopped, the flow then proceeds to step S7 and the stand-by state is maintained. Accordingly, this air conditioner continues to keep only the data stored in RAM 2 until the capacitor 15 is discharged.

Thereafter, if the charge exists in the capacitor 15 and restoration of the services failure or the supply of the power source is started once again while the back-up operation of RAM 2 is conducted, the reset signal output portion 13 outputs the reset signal and the initial processing is executed from step S1 in the same way as described above. Since the content of RAM 2 has been backed up by the capacitor 15, the data of the address AA is in agreement with the data of the address AO. (The data of the address AO has been moved from ROM 3 to the address AA at the previous start.) Accordingly, the flow proceeds to step S4 without executing step S3 and the program of the main processing is run. Since the air conditioner is kept in operation by the data of RAM 2 at this time (due to the previous manual setting), the compressor is turned "ON" based on this data and the blower is turned "ON", for example, so that the operation of the air conditioner is automatically started again under the same operating condition as at the time of stopping (or at the time of cut-off of the power supply).

When restoration of the service failure or the supply of the power source is restarted after the capacitor 15 is discharged, the reset signal is likewise output, but since step S2 is not satisfied, the flow proceeds to step S3, where the data of RAM 2 is re-written to the initial data of ROM 3. Accordingly, the air conditioner enters the stop state when the program of the main processing is run.

When restoration of the service failure or the supply of the power source is re-started while the charge exists in the capacitor 15 as described above, the operation of the air conditioner is automatically started again under the same operating condition as at the time of the service failure or the re-start of the supply of the power source and when restoration of the service failure or the supply of the power source is re-started after the capacitor 15 is discharged, the air conditioner is kept stopped.

Next, the processing system of the present invention at the time of cut-off of the power source will be explained with reference to the same embodiment as described above.

In FIG. 1, the voltage drop detection circuit 16 outputs the signal when the voltage of the power source bus 1 reaches about 95% of the rated voltage of the microprocessor 1. The rated voltage of the microprocessor used in this embodiment is 5 V and the operation guarantee voltage is from 4.5 V to 5.5 V. Therefore, 95% of the rated voltage corresponds to about 4.75 V. Accordingly, this voltage drop detection circuit 16 outputs a signal when the voltage of the power source bus 1 is below 4.75 V. Since the back-up time is the time period in which the voltage of the capacitor 15 becomes below the voltage necessary for driving RAM 2, the detection voltage of this voltage drop detection circuit is preferably as high as possible and a voltage which does not cause an erroneous operation due to a ripple of the voltage of the power source bus 1 is preferable. From these aspects, about 95% of the rated voltage is optimal.

Detecting the signal from the voltage detection circuit 16, the microprocessor 1 enters the stop mode, that is, the mode in which only the power supply to RAM 2 is made after the operation of the interface portion 4 is stopped. When the operation of the interface portion 4 is stopped, the inputs from the temperature sensor 7, the humidity sensor 8 and the key group 9 are cut off, the devices such as the compressor 10 and the blowers 11, 12 are stopped and only the preservation of the data of RAM 2 is maintained.

FIG. 5 is an operation explanatory view showing the principal operations of the microprocessor 1. When the reset signal is first output from the reset signal output portion 13, step S1 is executed by the reset processing portion 5. The operating condition of the air conditioner is set to the stop state at step S1. If the content of RAM 2 is backed up by the capacitor 15 at this time, the operation program of step S2 is as such executed without changing the content of RAM 2 and if the content of RAM 2 is not backed up by the capacitor 15, the operation program of step S2 is executed after the initial data of ROM 3 is transferred to RAM 2. The operation program of the air conditioner is run at this step S2. For example, the room temperature is compared with the set temperature stored in RAM 2, the blast quantity of the blower is controlled by the difference between the room temperature and the set value and the time is counted during the timer operation. Next, the flow proceeds to step S3 and a determination is made whether or not the voltage of the power source bus 1 drops below 4.75 V. In other words, whether or not the signal is output from the voltage drop detection circuit 16 is determined. When the voltage of the power source bus 1 drops, the flow proceeds to step S4. At this step S4, the devices are turned OFF. In other words, the air conditioner is stopped. Next, the flow proceeds to step S5, where the operation of the interface portion 4 is stopped. Therefore, the A/D conversion operation of the analog data by the temperature sensor 7 and humidity sensor 8 and the key scan input of the key group 9 are stopped. The flow then proceeds to step S6, where the processor unit 6 is kept under the stop mode. The reset signal may be output in order to release this stop mode.

If the voltage of the power source supplied from the power source bus 1 drops below 4.75 V due to the service failure or cut-off of the power source during the operation of the air conditioner having such a construction, that is, if the voltage drop detection circuit 16 outputs the signal, the microprocessor 1 executes the steps S4 to S6. Namely, the operation mode becomes the stop mode after the air conditioner is set to the stop mode. Accordingly, in this air conditioner, the data stored in RAM 2 is preserved until the charge stored in the capacitor 15 is discharged.

Thereafter, if restoration of the service failure or re-start of the supply of the power source is made while the data of RAM 2 is preserved, the reset signal output portion 13 outputs the reset signal and the initial processing of step S1 is executed. Since the content of RAM 2 has been backed up by the capacitor 15, the operation is as such carried out once again.

Next, another embodiment of the invention, wherein another processing system at the time of cut-off of the power supply of the invention is carried out in such an air conditioner, will be explained.

Figure 7:
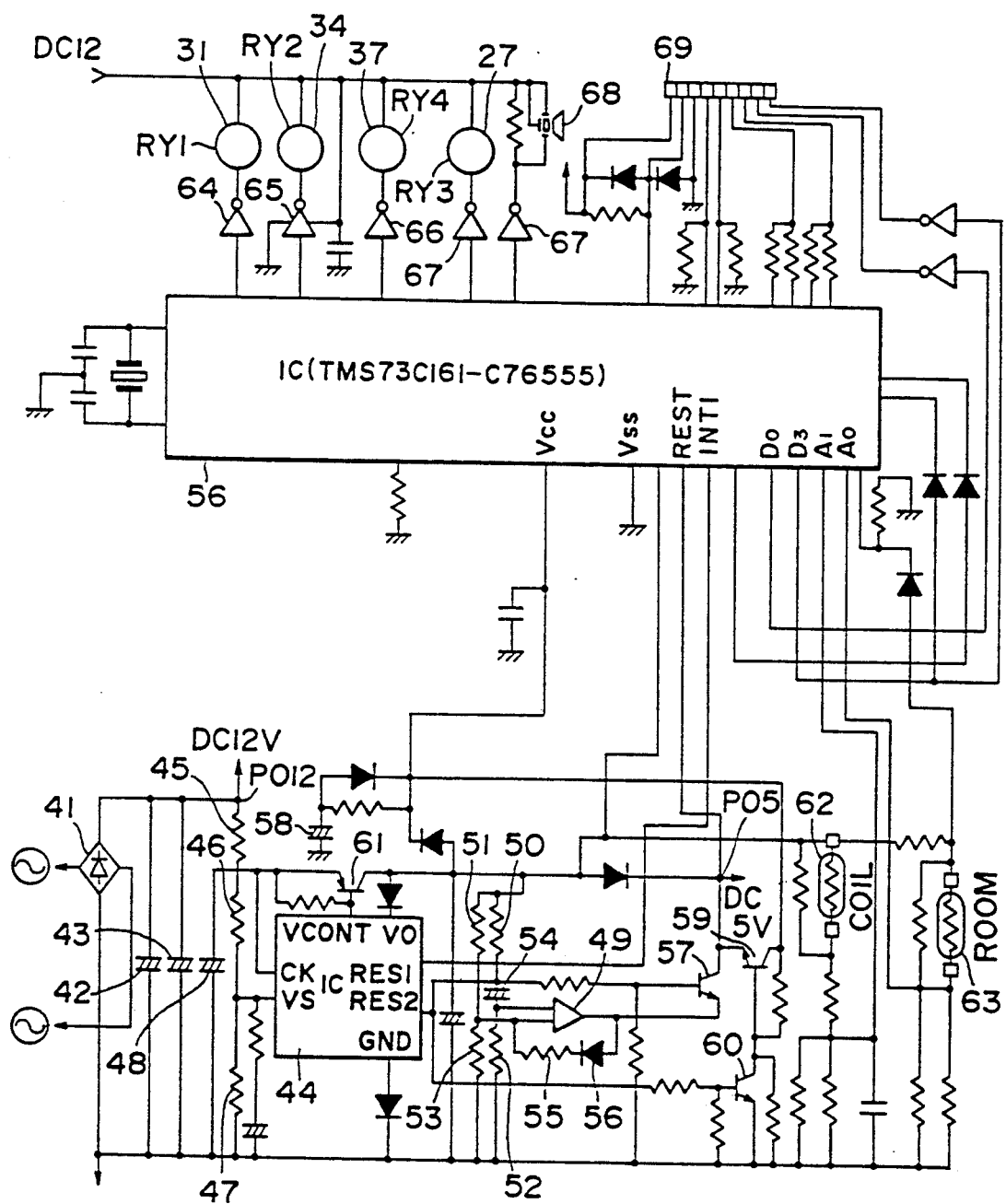

In this air conditioner, a refrigeration system having a compressor, a condenser, an expansion device and an evaporator are connected in a refrigerant flow relationship, and the evaporator is disposed on the indoor side so as to cool the inside of a room by the evaporation of the compressed cooling medium. FIGS. 6, 7 and 9 are electronic circuit diagrams for controlling the operation of this air conditioner. In FIG. 6, reference numeral 21 represents a plug connected to an A.C. power source; 22 is the compressor; and 23 is a blower motor which sends the blast to an outdoor heat-exchanger (condenser) and which is connected in such a manner as to be turned on and driven simultaneously with the compressor 22. References numerals 24 and 25 represent operation capacitors for the compressor 22 and for the blower motor 23, respectively. Reference numeral 26 represents a normally-open contact, which is closed when a relay 27 is excited (the relay 27 being shown unexcited in the drawing). When this normally open contact 26 is closed, the compressor 22 and the blower motor 23 are energized.

Reference numeral 38 represents a blower motor for sending the blast to an indoor heat-exchanger (evaporator). Intermediate terminals are provided to an excitation coil so that the wind velocity can be switched to three stages, i.e., L (little wind), M (medium wind) and H (hard wind). Reference numeral 39 represents an operation capacitor for the blower motor 38 and reference numeral 30 represents a change-over contact, which is switched to the opposite state to the state shown in the drawing when a relay 31 is excited. Reference numerals 32 and 33 represent change-over contacts which are switched in the interlocking arrangement with each other and are switched to the opposite state to the state shown in the drawing when a relay 34 is excited. The wind velocity is switched to L, M and H by the switching combinations of these change-over contacts 30, 32 and 33.

Reference numeral 35 represents a flap motor, which changes the direction of wind obtained by the operation of the blower motor 38. When this motor 35 is energized, the wind direction is changed continuously within a predetermined range of angles. This motor 35 is energized when a normally-open contact 36 is closed and this contact 36 is in turn closed when relay 37 is excited. When it is described to fix the wind direction at a predetermined angle, the motor 35 is first energized and is then stopped when the desired wind direction is attained.

Reference numeral 381 represents a current fuse and reference numeral 49 represents a varistor disposed on the primary side of a step-down transformer 40.

Reference numeral 41 represents a bridge diode for full wave rectification. After the A.C. output from the step-down transformer is subjected to full wave rectification, it is smoothed by smoothing capacitors 42, 43 so that the output of DC 12 V can be obtained at the position of a point P012.

Reference numeral 44 represents an IC (LA5693D) for resetting a microcomputer 156. This IC 44 outputs a reset signal from its terminals RES1, RES2 in accordance with the change of the voltage applied to a terminal VS. Reference numerals 45, 46 and 47 represent voltage division resistors and reference numeral 48 represents a capacitor, which adjusts the output timing of the reset signal by adjusting the level of the voltage applied to the terminal VS of IC 44.

Reference numeral 61 represents a transistor whose base terminal is connected to the terminal VCONT of IC 44. This transistor 61 is subjected to ON/OFF control by the switching output from the terminal VCONT so that the voltage applied to the terminal VO of IC 44 is 5V. Accordingly, the constant voltage output of DC 5 V can be obtained at the position of point P05.

The terminals RES1 and RES2 output the same signal when the terminal CK of IC 44 is pulled up to the power source voltage side. In this embodiment the signal outputs of the terminals RES1, RES2 are set in the following manner by suitably setting the resistance values of the resistors 45–47 and the capacitance of the capacitor 48. Namely, an H level (5 V) voltage is output when the voltage at the position of the point P05 is at least 4.9 V and this H level output voltage changes to an L (substantially zero volt) voltage output when the voltage at this point P05 is thereafter below 4.75 V.

The terminal RES1 of IC 4 is connected to the terminal INTI of the microcomputer 156. The terminal RES2 is connected to the terminal REST of the microcomputer 156 after passing through a delay circuit. The delay circuit comprises a comparator 49, resistors 50–53, a capacitor 54, a resistor 55 and a diode 56 for positive feedback, and a transistor 57. The resistance values of these resistors and the capacitance of the capacitor are set so that this delay circuit has a delay of about 200 μs when the output of the terminal RES2 of IC 44 changes from the L level voltage to the H level voltage.

Reference numeral 58 represents a back-up capacitor and reference numerals 59 and 60 represent switching transistors. Before applying the power source, the output of the terminal RES2 of IC 44 is the L level voltage. Therefore, charge is not stored in the back-up capacitor 58. The transistor 57 is OFF, the transistor 60 is OFF and the transistor 59 is OFF. Thereafter, when the power source is applied and the output of the terminal RES2 of IC 44 becomes the H level voltage, the transistor 57 is ON and the terminal REST of the microcomputer 156 attains the L level because 5 V voltage is supplied to the terminal Vcc of the microcomputer 156. At this time the transistor 59 is OFF simultaneously. Thereafter, when the output of the comparator 49 becomes the H level voltage, the transistor 57 is OFF and the applied voltage of the terminal REST of the microcomputer 156 changes to the H level voltage. In other words, the terminal REST of the microcomputer 156 changes from the L level to the H level voltage and resets the microcomputer 156. Then, the charge is charged to the backup capacitor 58 and this charging is kept while the power source voltage is supplied. The output of the terminal REST1 of IC 44 is the same as the output of the terminal REST 2 and the H level voltage is applied to the terminal INT1 of the microcomputer 156. If the cut-off of the power source voltage (such as a service failure) occurs after such a state, the voltage applied to the terminal VS of IC 44 decreases gradually matching the discharge of the charges of the capacitors 42, 43 and 48. The outputs of the terminals RES1 and RES2 of IC 44 first fall to the L level voltage in accordance with this voltage drop. Therefore, the applied voltage of the terminal INT1 of the microcomputer 156 first changes to the L level voltage. Thereafter, the transistors 57 and 60 are OFF after the discharge of the charge of the capacitor 54 and at the same time, the transistor 59 is ON. Since the transistor 59 is ON, the charge stored in the capacitor 58 is supplied to the terminal REST of the microcomputer 156 through this transistor 59. This power supply time is determined by the quantity of the charge stored in the capacitor 58. The operations described above with the passage of the time are shown in FIG. 3.

The capacitor 58 is for the microcomputer 156 (mainly for backing up RAM 74) and its capacitance is set with the backup time of about 10 minutes being the guideline. The IC 44 changes the outputs of the terminals RES1, RES2 from the H level voltage to the L level voltage when the voltage is below about 95% of the rated voltage applied to the microcomputer 156. The rated voltage of the microcomputer used in this embodiment is 5 V and its operation guarantee voltage is from 4.5 to 5.5 V. Therefore, 95% of the rated voltage described above is about 4.7 5 V. The back-up time is the period of time in which the voltage of the capacitor 58 becomes below the voltage necessary for driving RAM 74. Therefore, the detection voltage of the voltage detection circuit is preferably as high as possible and is a voltage which does not cause an erroneous operation due to a ripple of the voltage of the power source. From these aspects, about 95% of the rated voltage is optimal.

Reference numerals 62 and 63 represent temperature sensors for detecting the temperature of the indoor heat-exchanger (evaporator) and the temperature of the room to be air-conditioned, respectively, and these sensors are types whose internal resistance changes with temperature, such as a thermistor. These temperature sensors are connected in series with bias resistors to the power source voltage and the change of the internal resistance of the temperature sensors can be taken out as the change of the voltage. The change of the voltages is applied to the terminals A1, A2 of the microcomputer 156, respectively. These terminals A1 and A2 are the input terminals of the analog voltage and are connected to an A/D (analog/digital) conversion circuit inside the microcomputer 156. In other words, the voltages applied to these terminals are converted to digital values and are processed inside the microcomputer.

Reference numerals 64 to 67 represent drivers, each of which excites the relay 31, 34, 37, 27 based on the output from the microcomputer 156. Reference numeral 167 represents a driver for driving a buzzer and this driver actuates the buzzer 68 in accordance with the signal from the microcomputer 156.

Reference numeral 69 represents a connector, which is connected to an electronic circuit shown in FIG. 9. In FIG. 9, reference numerals 70 and 71 represent light emission diodes, whose ON/OFF is controlled in accordance with the outputs from the terminals DO, D3 of the microcomputer 156. Reference numeral 72 represents a reception amplifier portion, which receives an infrared signal from a remote controller, amplifies the signal and then outputs it to the microcomputer 156. The remote controller outputs control signals such a the start/stop operations of the air conditioner, temperature setting, setting of wind direction and quantity, and so forth, by wireless signals.

FIG. 10 is a block diagram showing the internal structure of the principal portions of the microcomputer 156 shown in FIG. 7. In the diagram, the microcomputer 156 includes a processor unit 73, a random access memory (RAM) 74, a read-only memory (ROM) 75, an interface 76, a reset processing portion 79, a stop mode processing portion 80, and A/D input processing portions 77, 78. These elements are all molded in unitary structure. A terminal +Vcc is a power source input terminal and a terminal Vss is a ground terminal. This processor unit 73 executes the processing operation based on the program and initial data stored in ROM 75 and based on data which is input and output to and from RAM 74 through the interface 76. This interface 76 inputs the room temperature of the room to be air-conditioned and the temperature of the evaporator obtained from the A/D input processing portions 77, 78 and the remote controller signals obtained from the reception amplifier portion, and outputs the relay excitation signal the buzzer activation signal, the ON signal of the light emission diodes, and the like. Reference numeral 79 represents a reset processing portion, which gives a signal to the processor unit and lets it execute the program for start processing when a signal is given thereto from outside (the voltage change of the applied voltage changes from the L level to the H level).

When the applied voltage of the terminal INT1 changes from the H level voltage to the L level voltage, the stop mode processing portion operates and the microcomputer 156 enters the stop mode, that is, the mode wherein the operation of the interface 76 is stopped and then only power supply to RAM 74 is made. Since the operation of the interface 76 stops, the inputs from the temperature sensors 62, 63 and remote controller are cut off, the devices such as the compressor, the blowers, etc, are stopped and only data preservation of RAM 74 is mainly made.

In the construction described above, the main operation of the microcomputer 156 is the same as that of the embodiment described already. Namely, in FIG. 10, when the reset signal, which changes the voltage applied to the reset processing portion 79 changes from the L level voltage to the H level voltage, is provided, the reset processing portion 79 first executes step S1. The operating condition of the air conditioner is set to the stop state at this step S1. If the content of RAM 74 is backed up by the capacitor 58 at this time, the content of RAM 74 is not changed but the operation program of step S2 is as such executed. If the content of RAM 74 is not backed up by the capacitor 58, the initial data of ROM 75 is first moved to RAM 74 and then the operation program of the air conditioner is executed at step S2. For example, the operation of the compressor is controlled by comparing the room temperature with the set temperature stored in RAM 74, the blast quantity from the blower is controlled by the difference between the room temperature and the set value and the time is counted at the time of the timer operation. Then, the flow proceeds to step S3, and a determination is made whether or not the power source voltage drops to 4.75 V or in other words, whether or not the voltage applied to the stop mode processing portion 80 changes from the H level voltage to the L level voltage is determined. If the power source voltage drops, the flow proceeds to step S4. The devices are turned OFF at this step S4. Next, the flow proceeds to step S5, where the operation of the interface 76 is stopped. In this manner, the supply of power to the temperature sensors 62, 63, the A/D conversion of the analog data and the input from the remote controller are stopped. The flow then proceeds to step S6, where the processor unit 73 is kept in the stop mode. This stop mode can be released by applying the reset signal to the reset processing portion.

At this time, since the H level voltage is kept applied to the REST terminal of the microcomputer 156, the processor unit 73 of the microcomputer 156 is under the stable state and the consumed current of the microcomputer 156 can be reduced by about 500 μA. If the L level voltage is kept applied to the REST terminal of the microcomputer 156, there is current consumption of about 10 mA.

Accordingly, if the voltage supplied to the microcomputer 156 drops below 4.75 V due to the service failure or cut-off of the power source during the operation of the air conditioner having the construction as described above, that is, when the output of the terminal RESI of IC 44 changes from the H level voltage to the L level voltage, the microcomputer 156 enters the stop mode in accordance with the operations of steps S4 to S6. Therefore, in this air conditioner, the data stored in RAM 74 is preserved before the charge stored in the capacitor 58 is discharged fully. If restoration of the service failure is made or the supply of the power source is started again while the data of RAM 74 is preserved, the reset signal which changes the voltage applied to the terminal REST of the microcomputer 156 from the L level voltage to the H level voltage is provided, and the start processing of step S1 is executed. Since the content of RAM 74 is backed up by the capacitor 58, the operation is again executed as such.

As described above, in the system using a processor or microprocessor which executes a main processing based on a predetermined program after executing a predetermined initial processing when the microprocessor receives an input of a reset signal which is output at the time of restoration of a power source, the start processing system, after cut-off of the power source in accordance with the present invention, includes a ROM storing a program for executing the initial processing, a program for executing a main processing and initial data; a RAM for storing and reading data when the main processing is executed; and a backup circuit for keeping the driving state of the RAM for a predetermined period after the cutoff of the power source; and includes also in the program for executing the initial processing a program for comparing the data stored at a predetermined address area of the RAM with data stored at a predetermined position of the read-only memory and for moved the initial data stored in the ROM to the RAM when the result of the comparison does not prove coincident, or a program for executing the main processing by use of the data stored in the RAM when the result of the comparison proves coincident. Accordingly, if instantaneous service failure or instantaneous cut-off of the power source occurs during a predetermined period of time in which the RAM is backed up, the operation of the apparatus can be automatically resumed under the same state as before the service failure or the cut-off of the power source when restoration of the service failure is made or the supply of the power source is started again. If restoration of the service failure is made or cut-off of the power source is started again after the passage of the predetermined period described above, the apparatus keeps the stop state. Accordingly, the restoration operation of the service failure within a predetermined period of time becomes unnecessary for the control of the apparatus for which continuity of the operation is of utmost importance, and inspection and maintenance can be improved remarkable.

A microprocessor includes a processor unit and an random access memory for storing and reading data with this processor unit and is equipped with a stop mode for stopping the operation of part of the functions of the microprocessor while putting priority to its driving so as to limit power consumption. The processing system at the time of cutoff of the power source in accordance with the present invention includes a) a backup mechanism for keeping the power supplied to the microprocessor for at least a predetermined period of time from the cutoff of the power source and b) a voltage drop detection circuit for detecting the power source voltage supplied to the microprocessor. The processing system brings the microprocessor into the operation mode when the voltage value detected by this voltage detection circuit drops close to the operation guarantee voltage of the microprocessor. Accordingly, the microprocessor is brought into the stop mode before the power source voltage drops and the microprocessor becomes inoperative and driving of the RAM is made preferentially so as to protect the data of the memory. In this instance, since part of the other functions of the microprocessor is stopped to limit power consumption, backup for a long period can be made by reducing the capacity of the backup mechanism.

A microcomputer includes a processor unit which starts an operation based on a program when a signal, by an edge trigger, is applied to its reset terminal and an random access memory for storing and reading data with this processor unit. The microcomputer is equipped with a stop mode for stopping part of the functions of the random access memory while putting priority to its driving so as to limit power consumption. The processing system at the time of cutoff of power source in accordance with another embodiment of the present invention includes a) a backup circuit for keeping the power supply to a peripheral circuit of the microcomputer for at least a predetermined period of time from the cutoff of the power source and b) a voltage detection circuit for detecting the power source voltage supplied to the microcomputer in a peripheral circuit of the microcomputer. The processing system brings the microcomputer into the stop mode when the voltage value detected by this voltage detection circuit drops close to the operation guarantee voltage of the microcomputer and supplies the power from the backup circuit to the reset terminal during this stop mode. Accordingly, the microcomputer is brought into the stop mode before becomes inoperative as a result of the drop of the power source voltage, drives preferentially the random access memory and thus can protect the data of the memory. In this instance, since other functions are partially stopped so as to reduce power consumption, backup for a long period of time can be made even when the capacity of the backup function is reduced.

What is claimed is:

1. An air conditioner having a plurality of electric appliances including a compressor and blowers to maintain a room temperature to a desired temperature, said air conditioner comprising:
   a driver means for driving said plurality of electric appliances;
   a random access memory (RAM) for storing changeable set data to be read out, said changeable set data including a) data for deciding an ON state and OFF state of said air conditioner, b) data for controlling said blowers, and c) data about a desired temperature;
   a read only memory (ROM) for storing a) programs, b) first data and c) initial data to be read out, said programs including at least an initial program and a main program, said initial data being used for maintaining said air conditioner in said OFF state;
   a processor means for using said initial program to compared said first data stored in said ROM with said changeable set data stored in said RAM, and to change and store said initial data stored in said ROM to said changeable set data when said first data stored in said ROM is different from said changeable set data stored in said RAM,. said processor means of busing said main program to change and store said first data stored in said ROM to said changeable set data, to overwrite said changeable data stored in said RAM in response to user's operation, and to control said driver means, which drives said electric appliances, based on said room temperature, said desired temperature and other data of said changeable set data stored in said RAM for said air conditioner, said processor means being electrically connected to said RAM while an electric power is being supplied thereto so that read/write of said changeable set data is accomplished, said processor means being connected to said ROM while electric power is being supplied thereto so that said programs stored in said ROM, said first data stored in said ROM, and said initial data stored in said ROM is read out by said processor means, said processor means being electrically connected to said driver means for controlling said electric appliances so that a driver signal is supplied to said driver means while said main program is being run, said processor means for executing said initial program stored in said ROM after a reset signal is supplied, and for executing said main program stored in said ROM after said initial program, wherein said reset signal is generated when a primary supply of the electric power to the air conditioner is started; and a back-up means, connected to said RAM, for maintaining a back-up supply of electric power to said RAM for a predetermined period of time from when the primary supply of electric power is stopped, wherein when the reset signal is applied to said processor means after said predetermined period of time has expired, said processor means executes said initial program in which the changeable set data, which is stored in said RAM, is changed to initial data stored in said ROM and then said processor means executes the main program and starts to control the operation of said air conditioner based on a change in the changeable set data of said RMA, and when the reset signal is applied to said processor means prior to said predetermined period of time expiring, said processor means executes the main program and starts to control the operation of said air conditioners based on the changeable set data in said RAM.

2. An air conditioner according to claim 1 in which said backup means maintains the back-up supply of electric power to said processor means for said predetermined period of time from a stop of said primary supply of electric power, and
   wherein said processor means has a stop mode for partially stopping operation of said processor means to decrease consumption of electric power within said air conditioner, said stop mode being executed when electric voltage applied to said air conditioner is lowered to a predetermined value.

* * * * *

UNITED STATES PATENT AND TRADEMARK OFFICE
CERTIFICATE OF CORRECTION

PATENT NO. : 5,227,981
DATED : July 13, 1993
INVENTOR(S) : Hikaru KATSUKI et al

It is certified that error appears in the above-identified patent and that said Letters Patent is hereby corrected as shown below:

On the cover page, Item [75], Line 3, change "Oizumimachi" to -- Gunma-ken --.

On the cover page, Item [75], Line 3, after "all of", insert -- Japan --.

Signed and Sealed this

Fifteenth Day of March, 1994

Attest:

BRUCE LEHMAN

Attesting Officer          Commissioner of Patents and Trademarks